US010507870B2

(12) United States Patent
Moen et al.

(10) Patent No.: US 10,507,870 B2
(45) Date of Patent: Dec. 17, 2019

(54) CALIBRATED FRAME STIFFNESS GRADIENT IN AN AGRICULTURAL PRODUCT SPRAYER

(71) Applicant: CNH Industrial America LLC, New Holland, PA (US)

(72) Inventors: Richard A. Moen, Glenwood, MN (US); Yong-chang Liu, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 119 days.

(21) Appl. No.: 15/805,366

(22) Filed: Nov. 7, 2017

(65) Prior Publication Data
US 2019/0135346 A1 May 9, 2019

(51) Int. Cl.
| | | |
|---|---|---|
| *B62D 21/18* | (2006.01) | |
| *B62D 27/02* | (2006.01) | |
| *B62D 21/02* | (2006.01) | |
| *B62D 21/10* | (2006.01) | |
| *A01M 7/00* | (2006.01) | |
| *A01C 23/00* | (2006.01) | |

(52) U.S. Cl.
CPC .......... *B62D 21/18* (2013.01); *A01M 7/0082* (2013.01); *B62D 21/02* (2013.01); *B62D 21/10* (2013.01); *B62D 21/186* (2013.01); *B62D 27/02* (2013.01); *A01C 23/00* (2013.01); *B60Y 2200/22* (2013.01)

(58) Field of Classification Search
CPC ........ B62D 21/02; B62D 21/09; B62D 21/10; B62D 21/18; A01C 23/00; B60Y 2200/22
See application file for complete search history.

(56) References Cited

U.S. PATENT DOCUMENTS

| | | | | |
|---|---|---|---|---|
| 2,809,050 A | * | 10/1957 | Bauer ................... | B62D 21/02 280/795 |
| 2,880,013 A | | 3/1959 | Dean | |
| 3,622,171 A | | 11/1971 | Georg | |
| 4,160,558 A | | 7/1979 | Fritsch | |
| 4,570,973 A | | 2/1986 | Ewers et al. | |
| 5,507,522 A | * | 4/1996 | Ritchie ................. | B62D 21/00 280/800 |
| 6,003,934 A | * | 12/1999 | Usui ................... | B62D 21/152 296/187.09 |

(Continued)

FOREIGN PATENT DOCUMENTS

| | | | | |
|---|---|---|---|---|
| DE | 102 16 274 A1 | * | 1/2003 | ............. B62D 21/02 |
| WO | WO 01/76896 A1 | * | 10/2001 | ............. B62D 21/02 |
| WO | WO 2009/086329 A1 | * | 7/2009 | ............. B62D 21/10 |

*Primary Examiner* — Frank B Vanaman
(74) *Attorney, Agent, or Firm* — Rebecca L. Henkel; Rickard K. DeMille

(57) ABSTRACT

A vehicle frame having a calibrated frame stiffness gradient is provided by fixedly attaching a series of cladding plates to an external surface of a tubular member of the frame, with the series of cladding plates including at least one immediately preceding cladding plate and one successive cladding plate. The cladding plates have thicknesses and peripheral shapes that are cooperatively configured to provide the desired stiffness gradient in the frame member. A trailing raised bead extending from the last cladding plate in the series along the surface of the frame member provides a further means for achieving the desired stiffness gradient.

20 Claims, 6 Drawing Sheets

(56) References Cited

U.S. PATENT DOCUMENTS

| | | | |
|---|---|---|---|
| 6,010,155 A * | 1/2000 | Rinehart | B62D 21/02 |
| | | | 280/781 |
| 6,412,818 B1 | 7/2002 | Marando | |
| 7,832,519 B2 | 11/2010 | Sakamoto et al. | |
| 9,150,073 B2 | 10/2015 | Lepre | |
| 2005/0116459 A1 * | 6/2005 | Ito | B62D 21/02 |
| | | | 280/781 |
| 2006/0033347 A1 | 2/2006 | Hauger et al. | |
| 2006/0208534 A1 * | 9/2006 | Regnell | B62D 21/02 |
| | | | 296/187.09 |
| 2008/0007088 A1 | 1/2008 | Newport | |
| 2016/0084433 A1 | 3/2016 | Wines | |
| 2017/0129545 A1 * | 5/2017 | Schauerte | B62D 27/023 |
| 2018/0291938 A1 * | 10/2018 | Arul | B23K 33/008 |

* cited by examiner

CALIBRATED FRAME STIFFNESS GRADIENT IN AN AGRICULTURAL PRODUCT SPRAYER

FIELD OF THE INVENTION

This invention generally relates to vehicle chasses, and more particularly to the chasses of self-propelled agricultural product applicators.

BACKGROUND OF THE INVENTION

Agricultural chemicals and fertilizers must be applied within very narrow time windows for maximum effectiveness. In some cases, this means that application must be performed after the crops have emerged, and sometimes even after the crops have grown to a height of several feet tall. To apply chemicals and fertilizers without damaging standing crops specialized self-propelled agricultural product applicators, having high ground clearance, such as so-called high-boy sprayers or dry product applicators, are often utilized with standing crops. The high ground clearance allows the applicator to move through the standing crops without damaging them. Such high ground clearance applicators also typically utilize independent drive and suspension systems for each wheel of the applicator, and provide some means for adjusting the track width of the wheels to match the row spacing of the crop being treated.

Achieving the high desired ground clearance presents unique problems in designing the main frame and suspension systems of the applicator. These problems are exacerbated by the operational necessities of having the applicator be capable of maneuvering across uneven ground, through ruts, ditches and waterways, carrying loads of thousands of pounds of dry or liquid agricultural product, while travelling at speed of up to 40 miles per hour. Having one of the wheels of the applicator drop into a ditch or impact a large rock while travelling fully loaded at high speed imposes major bending and twisting forces and stresses on the frame of the applicator.

It is also highly desirable to have the frame be as light as possible to reduce sprung weight of the applicator, so that the suspension components do not have to be sized to carry the additional weight, and to maximize payload of the applicator. To minimize sprung weight, the frames of prior applicators have utilized tubular frame members having a high section modulus and relatively low weight. Use of such tubular members has still resulted in frames that are heavier than desirable, in order to achieve the bending and torsional stiffness required for use in a self-propelled agricultural applicator.

The unique design constraints and operating environment of self-propelled agricultural product applicators precludes the use of many of the techniques used in producing frames and suspension systems for on-road vehicles, or off-road vehicles that do not require such extreme ground clearance.

It is desirable, therefore, to provide an improved frame having a calibrated bending and/or torsional stiffness gradient that is suitable for use in a self-propelled agricultural product applicator. It is also desirable to provide such an improved frame in a manner that is cost effective, and readily producible. It is further desirable to provide an improved frame that is as lightweight as possible, to minimize undesirable loading of suspension components and maximize payload of the applicator.

BRIEF SUMMARY OF THE INVENTION

The invention provides an apparatus and method for achieving a desired stiffness gradient in a vehicle frame including a tubular frame member, by fixedly attaching a series of cladding plates to an external surface of the tubular member, with the series of cladding plates including at least one immediately preceding cladding plate and one successive cladding plate. In various forms of the invention, the cladding plates may have thicknesses and peripheral shapes that are cooperatively configured to provide the desired stiffness gradient in the frame member. A trailing raised head extending from the last cladding plate in the series along the surface of the frame member may also be utilized as a further means for achieving the desired stiffness gradient.

In one form of the invention, a vehicle frame having a calibrated frame stiffness gradient, is provided. The frame includes a tubular frame member defining and extending along a tubular frame member axis, and defining an external surface of the tubular frame member. The frame also includes a series of cladding plates extending along an axis of the series of cladding plates and fixedly attached along faying (i.e. mating) surfaces to the external surface of the tubular member. The series of cladding plates includes at least one immediately preceding cladding plate and one successive cladding plate in the series of cladding plates. Each of the cladding plates in the series has a respective axis, and respective proximal and distal ends at substantially opposite axial ends of the cladding plates. The proximal end of each successive cladding plate is positioned to substantially abut the distal end of the immediately preceding cladding plate in the series when the series of cladding plates is fixedly attached to the tubular frame member with the axes of the cladding plates and series of cladding plates extending substantially along the tubular frame member axis.

In various forms of a frame according to the invention, a frame having a calibrated frame stiffness gradient may further include one or more of the following aspects: (1) a raised trailing bead fixedly attached to the external surface of the tubular frame member and extending substantially along the tubular member, with the trailing bead having a proximal end of the bead abutting the distal end of a last cladding plate in the series of cladding plates, and a length of the bead extending away from the distal end of the last cladding plate along the tubular member, with the bead terminating in a distal end of the bead separate from the last cladding plate; (2) at least one successive cladding plate having a peripheral profile that is different from its immediately preceding cladding plate; (3) at least one of the cladding plates having a peripheral profile differing from the external surface of the tubular member adjacent the flaying surface of the at least one cladding plate; (4) at least one successive cladding plate having a peripheral profile that is smaller than its immediately preceding cladding plate; (5) the distal end of at least one immediately preceding cladding plate is configured to be substantially convex where it abuts the proximal end of its respective successive cladding plate, and the proximal end of the respective successive cladding plate is cooperatively configured to be concave where it abuts the convex distal end of the immediately preceding cladding plate; (6) the thickness of at least one successive cladding plate is configured to be less than the thickness of the immediately preceding cladding plate; and (7) where the frame includes at least one longitudinal member joined to a transverse member of the frame at an intersection of the longitudinal and transverse frame members, the series of cladding plates is configured to include an immediately preceding cladding plate forming a corner reinforcement plate spanning the intersection of the longitudinal and transverse frame members, with the corner reinforcement plate being fixedly attached to both of the longitudinal and transverse frame members.

The invention may also take the form of an agricultural applicator including a vehicle frame having a calibrated frame stiffness gradient, according to the invention.

The invention may further be practiced in the form of a method for providing a calibrated frame stiffness gradient in a tubular frame member of a vehicle frame. Such a method may include fixedly attaching a series of cladding plates extending along an axis of the series of cladding plates along frying surfaces to an external surface of the tubular member, with the series of cladding plates including at least one immediately preceding cladding plate and one successive cladding plate in the series of cladding plates. Each of the cladding plates in the series may have respective axes and respective proximal and distal ends at substantially opposite axial ends of the cladding plates. The proximal end of each successive cladding plate may be positioned to substantially abut the distal end of the immediately preceding cladding plate in the series when the series of cladding plates is fixedly attached to the tubular frame member with the axes of the cladding plates and series of cladding plates extending substantially along the tubular frame member axis.

A method for providing a calibrated frame stiffness gradient in a tubular frame member of a vehicle frame, according to the invention, may further include at least one step from the group of steps including: (1) providing a raised trailing bead fixedly attached to the external surface of the tubular frame member and extending substantially along the tubular member, with the trailing bead having a proximal end of the bead abutting the distal end of a last cladding plate in the series of cladding plates, and a length of the bead extending away from the distal end of the last cladding plate along the tubular member, with the bead terminating in a distal end of the bead separate from the last cladding plate; (2) configuring at least one successive cladding plate to have a peripheral profile that is different from its immediately preceding cladding plate; (3) configuring at least one of the cladding plates to have a peripheral profile thereof differing from the external surface of the tubular member adjacent the faying surface of the at least one cladding plate (4) configuring at least one successive cladding plate to have a peripheral profile that is smaller than its immediately preceding cladding plate; (5) configuring the distal end of at least one immediately preceding cladding plate to be substantially convex where it abuts the proximal end of its respective successive cladding plate, and cooperatively configuring the proximal end of the respective successive cladding plate to be concave where it abuts the convex distal end of the immediately preceding cladding plate; (6) configuring the thickness of at least one successive cladding plate to be less than the thickness of the immediately preceding cladding plate; and, (7) where the frame includes at least one longitudinal member joined to a transverse member of the frame at an intersection of the longitudinal and transverse frame members, configuring the series of cladding plates to include an immediately preceding cladding plate forming a corner reinforcement plate spanning the intersection of the longitudinal and transverse frame members, with the corner reinforcement plate being fixedly attached to both of the longitudinal and transverse frame members.

A method according to the invention may further include the additional steps of determining a desired calibrated frame stiffness gradient in a tubular frame member of a vehicle frame, and attaching a series of cladding plates configured to provide the desired calibrated frame stiffness gradient. Some forms of a method may also include determining the dimensions and placement of one or more corner plates and/or one or more raised beads to provide the desired calibrated frame stiffness gradient, and attaching such corner plates and/or beads to the frame member.

Other aspects, objectives and advantages of the invention will be apparent from the following detailed description and accompanying drawings of exemplary embodiments of the invention.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents within the spirit and scope of the invention.

DETAILED DESCRIPTION OF THE INVENTION

Figure 1:
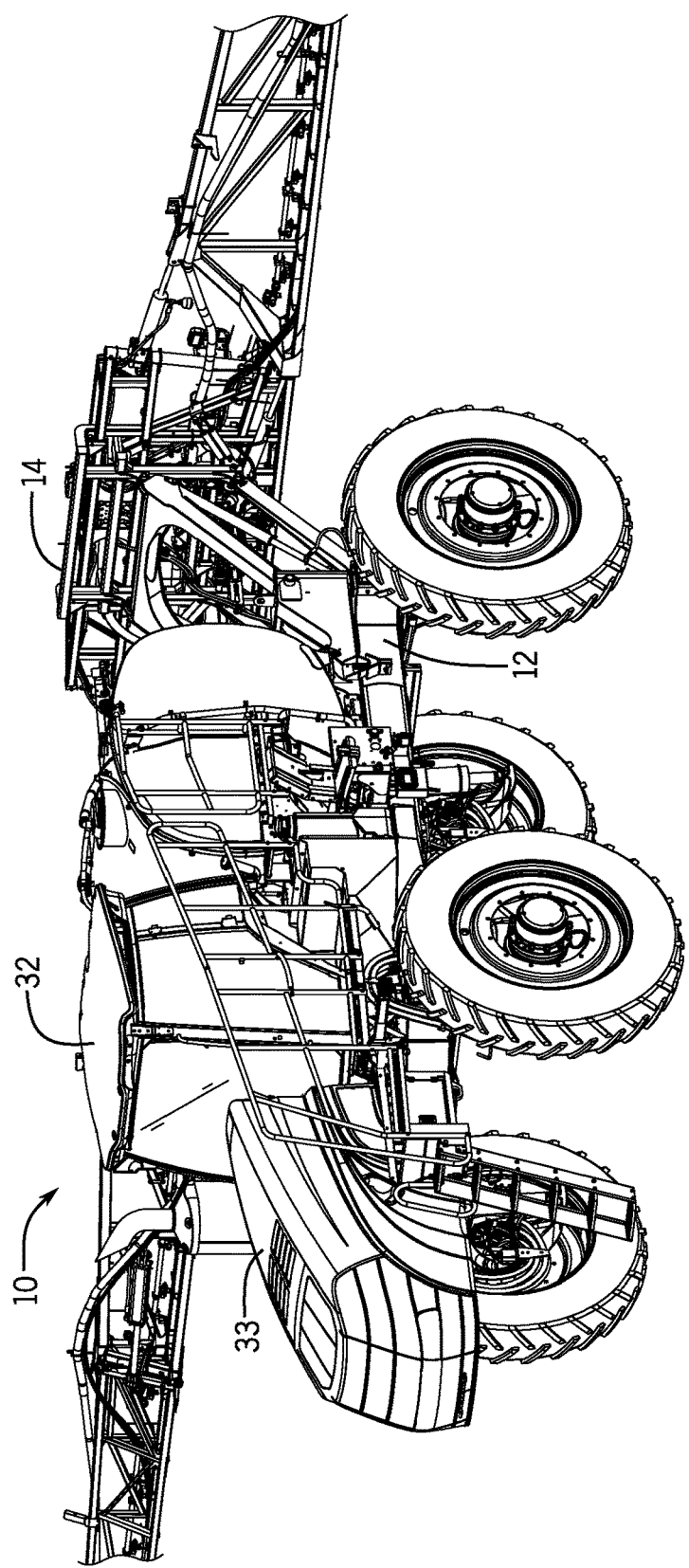
FIG. 1 is an isometric illustration of an exemplary embodiment of a self-propelled agricultural product applicator, including a frame having a calibrated stiffness gradient, in accordance with the invention.

FIG. 1 shows an exemplary embodiment of a self-propelled agricultural product applicator 10, which includes a frame 12 having a calibrated frame stiffness gradient, according to the invention. The frame 12 of the applicator 10 is configured to carry agricultural product application equipment, such as a sprayer 14 for applying liquid products, or a dry-box (not shown) for applying a dry product such as lime.

Figure 2:
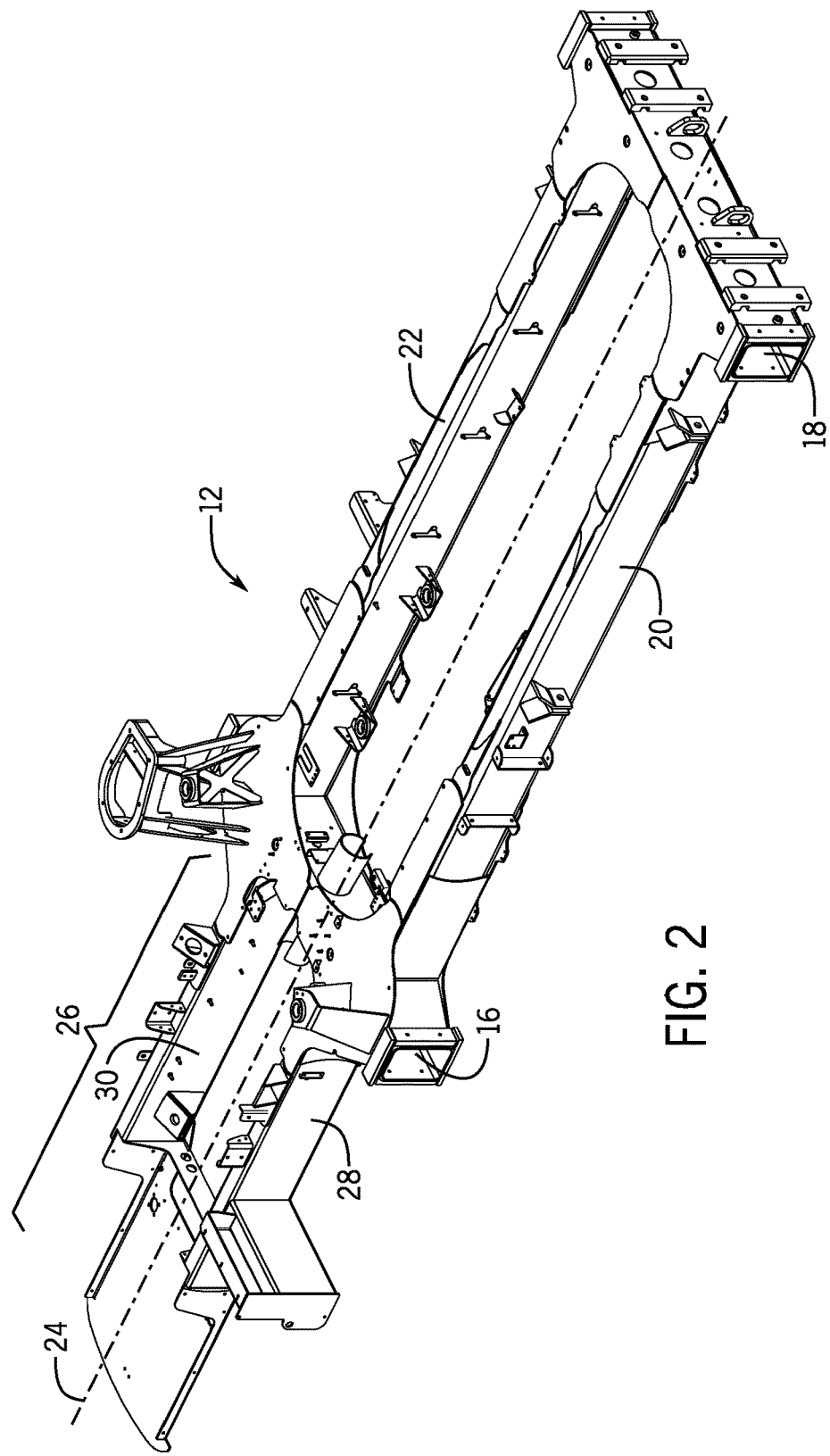
FIG. 2 is an isometric illustration of the frame of the exemplary embodiment of the invention of FIG. 1.

As shown in FIG. 2, the frame 12 includes a front transverse member 16, and a rear transverse member 18, joined together by left and right main longitudinal frame members 20, 22, to form a generally rectangular box-shaped structure extending along a central longitudinal axis 24 of the frame 12. The frame 12 also includes a cantilevered section 26 extending forward along the frame axis 24 from the front transverse member 16. The cantilevered section 26 is includes left and right cantilevered section longitudinal frame members 28, 30 that attach the cantilevered section 26 to the front transverse member 16. The engine (not shown), hood 33 (see FIG. 1) and parts of the cab 32 (see FIG. 1) of the applicator 10 are supported by the cantilevered section 26.

Figure 3:
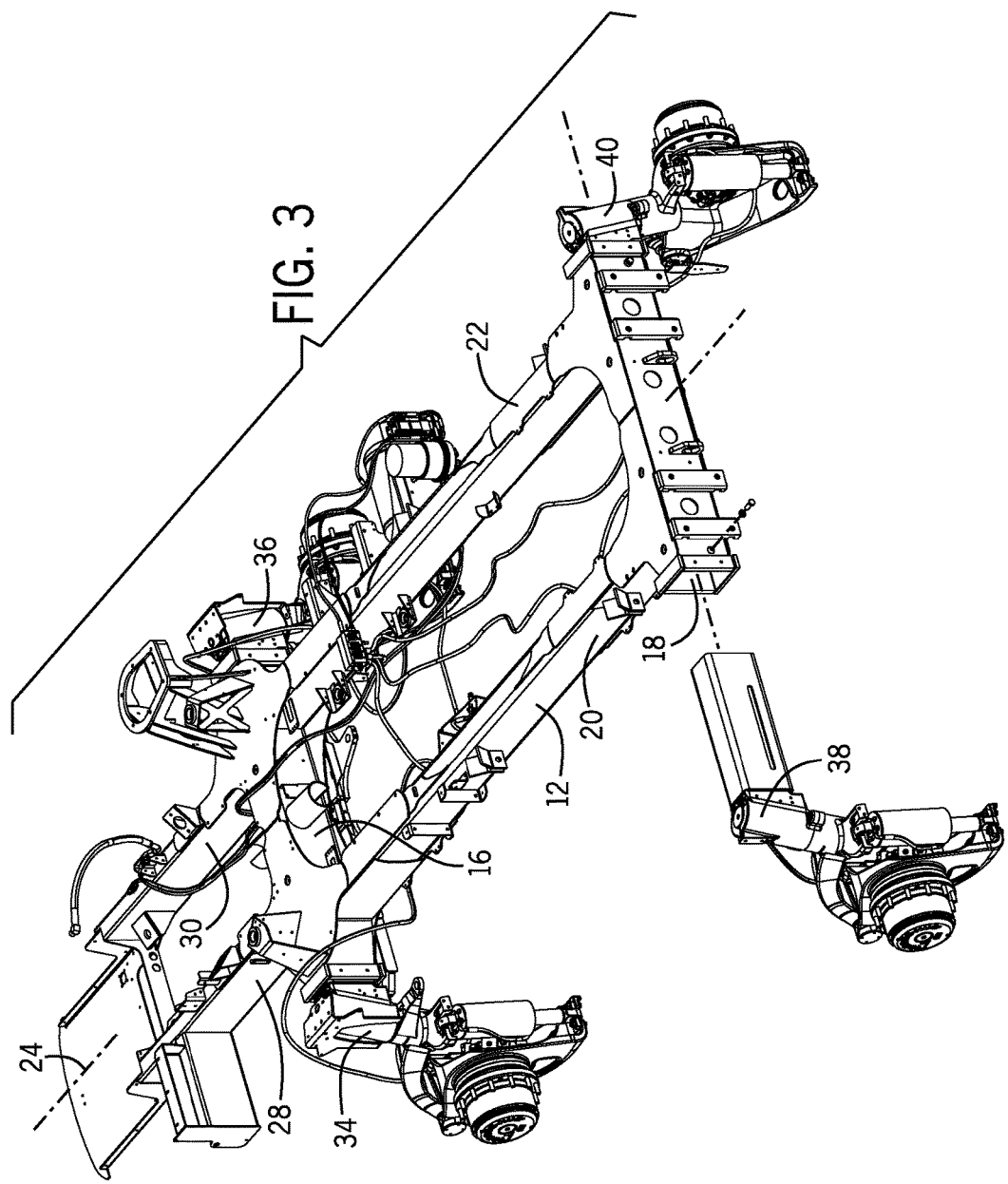
FIG. 3 is a partly exploded isometric view of the frame of FIG. 2 and four independent drive and suspension units connected to transverse tubular members of the frame of FIG. 2.

As shown in FIG. 3, the front and rear transverse members 16, 18 of the frame 12 are rectangular tubes with open ends to receive suspension units 34, 36, 38, 40 of the applicator 10, in the manner indicated in FIG. 3. The main and cantilevered longitudinal frame members 20,22,28,30 of the exemplary embodiment of the frame 12 are also rectangular tubes, each having a respective longitudinal axis extending generally parallel to the longitudinal axis 24 of the frame 12. Each of the main and cantilevered longitudinal frame members 20,22,28,30 also defines a respective external surface including top, bottom, inboard and outboard sides of the tubular longitudinal frame members 20,22,28,30.

Figure 4:
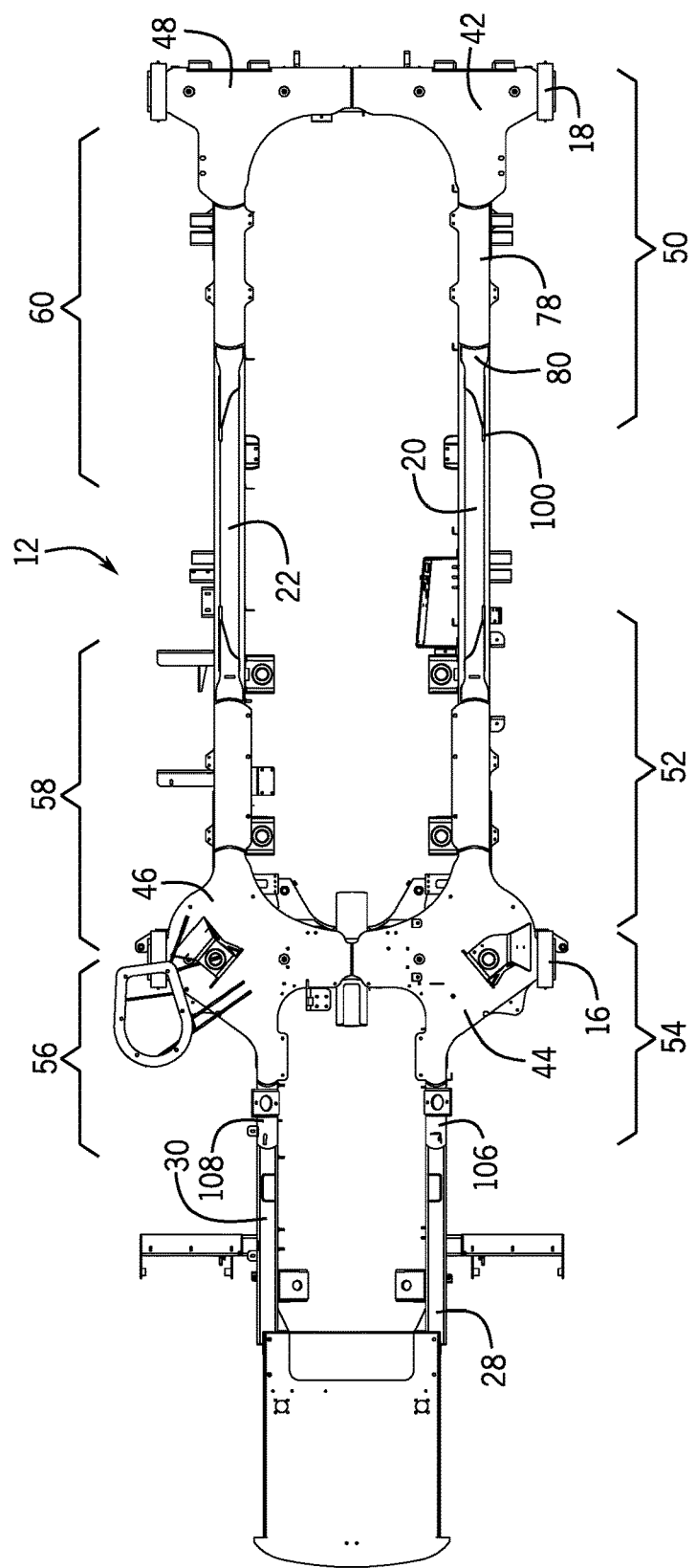
FIGS. 4 and 5 are respective top and bottom orthographic views of the frame of FIG. 2.

As shown in FIG. 4, the top surfaces of the transverse frame members 16,18 and the longitudinal frame members 20,22,28,30 are joined together at their respective intersections by four upper surface corner plates 42,44,46,48, that form part of six upper cladding plate series 50,52,54,56,58,60. As described in more detail below, each of the six upper cladding plate series 50,52,54,56,58,60 is a cladding series, according to the invention, applied to upper surfaces of the longitudinal frame members 20,22,28,30 in such a manner that a desired calibrated frame stiffness gradient is achieved in the frame 12 of the applicator 10.

Figure 5:
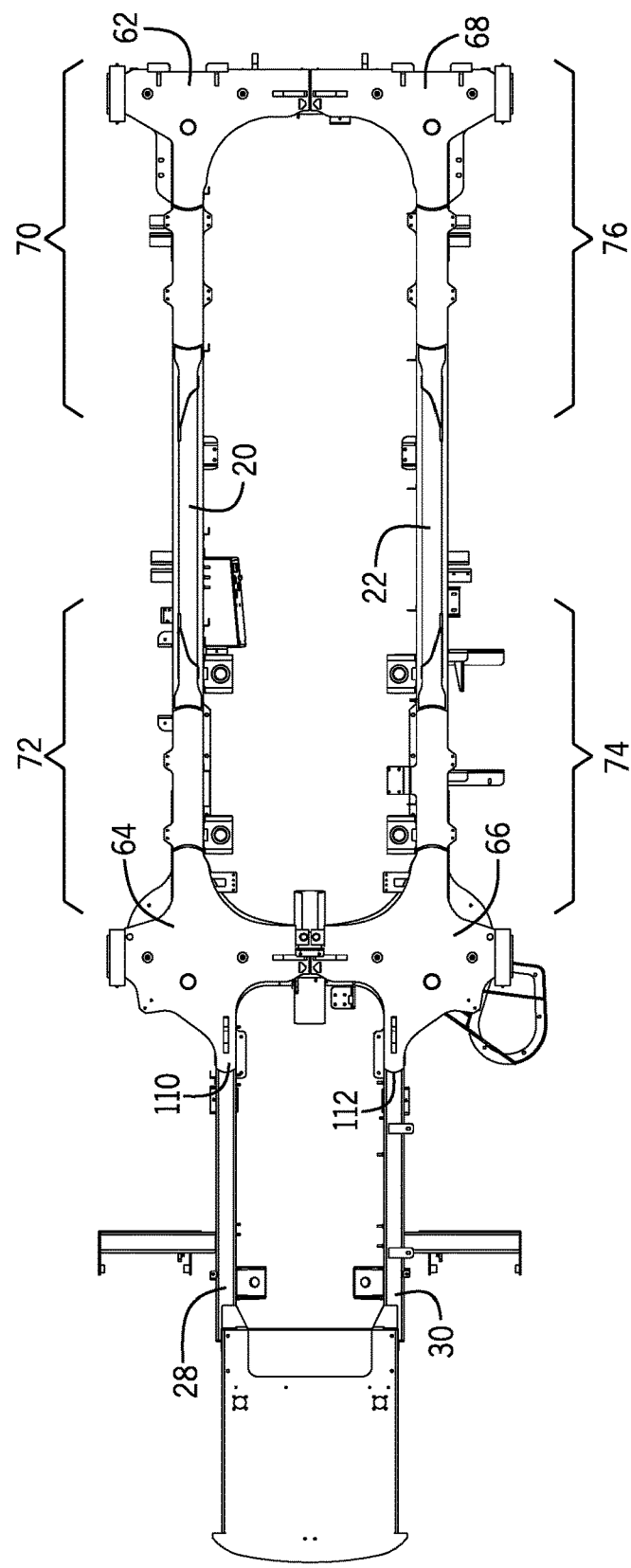

In similar fashion, as shown in FIG. 5, the bottom surfaces of the transverse frame members 16,18 and the longitudinal frame members 20,22,28,30 are joined together at their respective intersections by four lower surface corner plates 62,64,66,68, that form part of four lower cladding plate series 70,72,74,76. Each of the four lower cladding plate series 70,72,74,76 is a cladding series, according to the invention, applied to lower surfaces of the longitudinal frame members 20,22,28,30 in such a manner that a desired calibrated frame stiffness gradient is achieved in the frame 12 of the applicator 1.0.

Because the cladding plate series tend to be similar and symmetrical, only the cladding series 50 associated with the upper left rear corner plates 42 and the cladding series 52,54 associated with the upper and lower left front corners of the frame 12 will be described in detail below.

As shown in FIG. 4, the cladding series 50 for the upper left rear corner or the frame 12 includes the corner plate 42, which serves as a first immediately preceding cladding plate, and first and second left rear upper corner successive cladding plates 78,80 in the series 50 of cladding plates 42,78,80.

Figure 6:
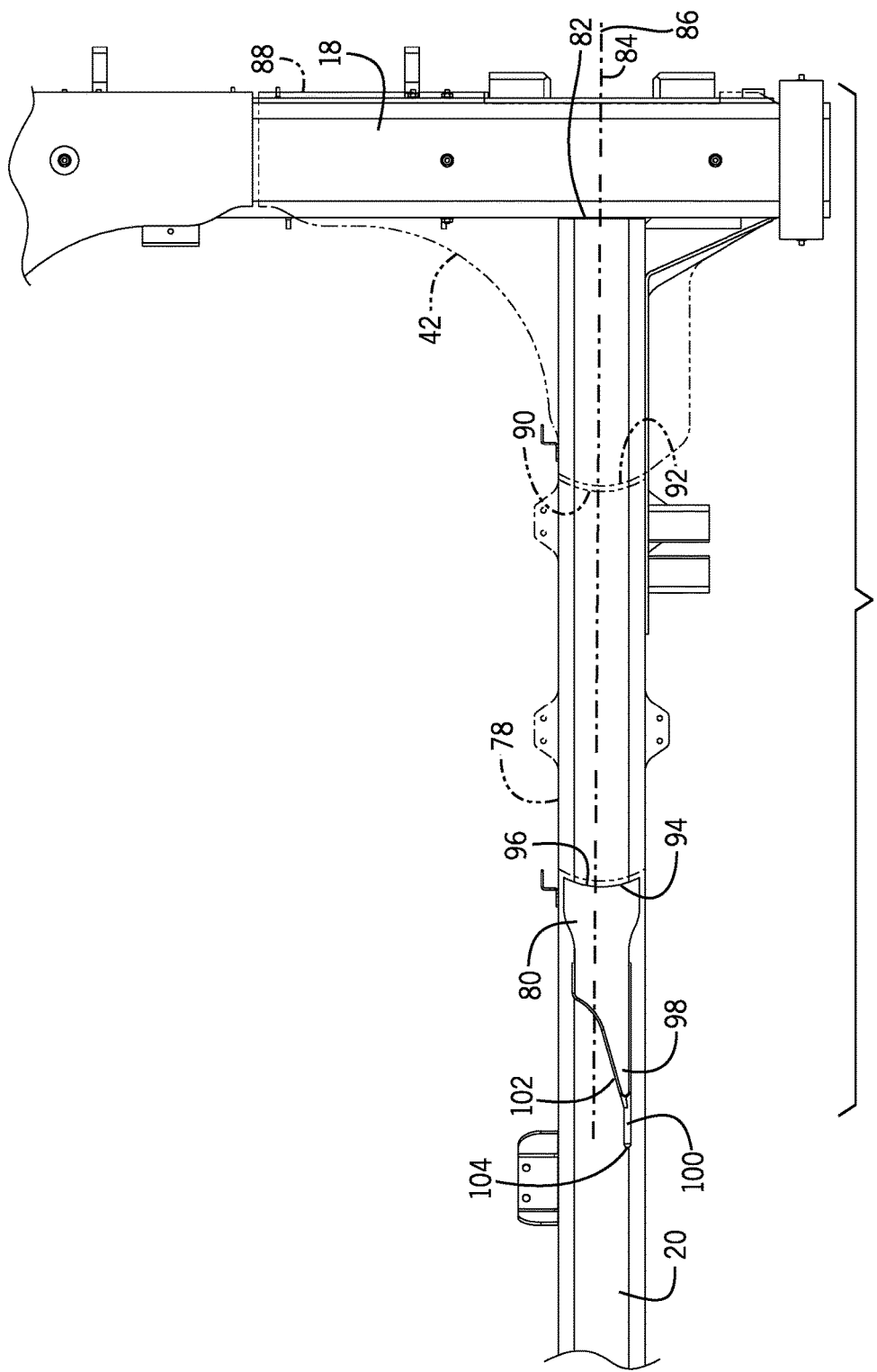
FIG. 6 is an enlarged view of a portion of FIG. 4, with several components of the frame shown as transparent and indicated by phantom lines in FIG. 6 to illustrate various features of the exemplary embodiment of the frame.

As shown in FIG. 6, where the left rear corner plate 42 and the first left rear upper corner successive cladding plate 78 are transparent and indicated by phantom lines, the rear end of the left main longitudinal member 20 is joined to the front surface of the rear transverse member 18 of the frame 12 at an intersection 82 of the longitudinal and transverse frame members 20,18. As noted above, the series 50 of cladding plates 42,78,80 is configured such that the first immediately preceding cladding plate in the series 50 forms the corner reinforcement plate 42, which is placed to span the intersection 82 of the left main longitudinal member 20 and the rear transverse frame members 18, with the left rear upper corner reinforcement plate 42 being fixedly attached to both of the longitudinal and transverse frame members 20,18.

As further indicated in FIGS. 4 and 6, the series 50 of cladding plates 42,78,80 extend sequentially along an axis 84 of the series 50 of cladding plates 42,78,80, and are fixedly attached along faying (i.e. mating) surfaces to the top surface of the left main longitudinal tubular member 20 of the frame 12. The axis 84 of the series of cladding plates 50 is substantially parallel to a longitudinal axis 86 of the left main frame member 20.

As best seen in FIGS. 4 and 6, each of the cladding plates 42,78,80 in the series 50 has a respective axis, which is coincident with the axis 84 of the series of cladding plates 50, and also has a respective proximal 88,92,96 and a distal end 90,94,98 at substantially opposite axial ends of the cladding plates 42,78,80. Because the series 50 of cladding plates extends forward along the upper surface of the left main longitudinal frame member 20, the proximal ends 88,92,96 of the cladding plates 42,78,80 are closer to the rear of the frame 12 than the distal ends 90,94,98. Said another way, the distal ends 90,94,98 of the cladding plates 42,78,80 point toward the front of the frame 12 in the cladding series 50 at the upper left rear corner of the frame 12. The proximal end 92,96 of each of the two successive cladding plates 78,80 in the series 50 is positioned to substantially abut the distal end respectively 90,94 of the immediately preceding cladding plate 42,78 in the series 50 when the series of cladding plates 42,78,80 is fixedly attached to the left main longitudinal frame member 20 with the axes 84 of the cladding plates 42,78,80 and series 50 of cladding plates extending substantially along the axis 86 of the left main longitudinal frame member 20.

In the exemplary embodiment of the invention, the cladding plates 42,78,80 are affixed to the left main longitudinal frame member 20 by weld beads extending along the respective peripheries of the cladding plates 42,78,80. As used herein, having the proximal end of a successive cladding plate "abut" the distal end of an immediately preceding cladding plate is intended to mean that after being fixedly attached to the frame member 20, there will not be a gap between adjacent cladding plates in a given series of cladding plates. Where the cladding plates are affixed by weld beads, as in the exemplary embodiment, it is contemplated that adjacent cladding plates may be initially placed with a slight gap between mating proximal and distal ends, so that a common weld bead may fill the gap and simultaneously bond the proximal and distal ends of the adjacent cladding plates to the underlying frame member, within the scope of the term "abut."

As also shown in FIGS. 4 and 6, the exemplary embodiment of the frame 12 also includes a raised, trailing weld bead 100 fixedly attached to the top of the external surface of the left main longitudinal frame member 20, and extending substantially along the frame member 20. The trailing bead 100 has a proximal end 102 of the bead 100 abutting the distal end 98 of a last cladding plate 80 in the series 50 of cladding plates 42,78,80. The bead 100 has a length of the bead 100 extending away from the distal end 98 of the last cladding plate 80 along the frame member 20, with the bead 100 terminating in a distal end. 104 of the bead 100 that is separate from, and not connected to the last cladding plate 80 in the series 50. Those skilled in the art will appreciate that the trailing bead allows stress concentrations that might otherwise exist at the distal end 98 of the second successive cladding plate 80 to be dispersed and dissipated over the length of the weld bead 100, to thereby assist in providing a calibrated stiffness gradient in the frame 12.

As will be apparent from FIGS. 4 and 6, the external peripheries of the cladding plates 42,78,80 differ from one another. It will also be apparent that the corner plate 42 has the largest periphery, with the peripheries of each of the cladding plates 78 and 80 becoming successively smaller in the series 50 of cladding plates. It will be further) apparent, with particular reference to FIG. 4, that the peripheries of all of the cladding plates 42,78,80 differ from the peripheral profile of the top surface of the left main longitudinal member 20 adjacent the faying surfaces of the cladding plates 42,78,80 where they are fixedly attached to the top surface of the left main longitudinal member 20. Specifically, the corner plate 42 has a periphery that extends substantially beyond the peripheries of the frame members 20,18. The first successive cladding plate 78 has a periphery that extends slightly beyond the periphery of the top surface of the left main longitudinal member 20. And, the second successive cladding plate 80 has a periphery that is smaller than the periphery of the top surface of the left main longitudinal member 20. It will be appreciated that by adjusting the peripheries of the cladding plates 42,78,80 in this manner, the section modulus and stiffness of the frame 12 is adjusted, thereby assisting in achieving a desired calibrated stiffness gradient in the frame 12.

As further shown in FIGS. 4 and 6, the distal end 90,94,98 of each immediately preceding cladding plate 42,78,80 in the series 50 is configured to be substantially convex where it abuts the proximal end 92,96 of its respective successive cladding plate 78,80, and the proximal end 92,96 of the respective successive cladding plate 78,80 is cooperatively configured to be concave where it abuts the convex distal end of the immediately preceding cladding plate 42,78. Having the ends of adjacent cladding plates 42,78,80 configured in this manner assists in achieving a smooth transition of stiffness across the ends of the cladding plates 42,78,80.

Furthermore, in the exemplary embodiment, the thickness of each successive cladding plate 78,80, in a direction away from the surface of the underlying frame members 18,20, is configured to be less than the thickness of the immediately preceding cladding plate 42,78. The corner plate 42 has the greatest thickness, with the thickness of the first successive cladding plate 78 being less than the corner plate 42, and the second successive cladding plate 80 having a thickness less than either the corner plate 42 or the intervening second successive cladding plate 78. Reducing the thickness of successive cladding plates 78,80 in this manner also assists in achieving a desired calibrated stiffness gradient in the frame 12.

As shown in FIGS. 4 and 5, all of the series 50,52,58,60; 70,72,74,76 of cladding plates joining the front and rear transverse frame members 16,18 to the left and right main longitudinal frame members 20,22 are configured in the same manner as described above in relation to the cladding series 50, with reference to FIGS. 4 and 6. Each of these series of cladding plates 50,52,58,60;70,72,74,76 include the equivalent of the corner plate 42, first and second successive cladding plates 78,80 and trailing raised bead 100, at the upper left rear corner of the frame 12.

As shown in FIG. 4, the left front upper corner plate 44 serves a dual purpose as the first immediately preceding cladding plate of both of the rearward extending series of cladding plates 52 joining the left main longitudinal frame member 20 to the front transverse frame member 16, and the forward extending series 54 of cladding plates 44,106 joining the upper surface of the left cantilevered longitudinal frame member 28 to the front transverse frame member 16. The series of cladding plates 54 does not include a second successive cladding plate, or a trailing weld bead.

In similar fashion, as also seen in FIG. 4, the right front upper corner plate 46 serves a dual purpose as the first immediately preceding cladding plate of both of the rearward extending series of cladding plates 58 joining the left main longitudinal frame member 20 to the front transverse frame member 16, and the forward extending series 56 of cladding plates 46,108 joining the upper surface of the right cantilevered longitudinal frame member 30 to the front transverse frame member 16. The series of cladding plates 56 does not include a second successive cladding plate, or a trailing weld bead.

As shown in FIG. 5, the exemplary embodiment of the frame 12 does not include a cladding series extending forward along the underside of either the left or right cantilevered longitudinal frame members 28,30. The forward facing distal ends 110,112 of the left and right lower front corner plates 64,66 respectively are both contoured to provide a concave shaped transition from the corner plates 64,66 to the left and right cantilevered longitudinal frame members 28,30.

From the foregoing description of the exemplary embodiments, those having skill in the art will recognize that the invention provides an elegantly simple yet sophisticated approach to achieving a desired stiffness gradient in the frame of an agricultural product applicator.

By joining the transverse and longitudinal frame members 16,18,20,22,28,30 together with corner plates and selectively cladding sections of the main longitudinal frame members with series of cladding plates including the corner plates, and having the various configurations described above, the bending and torsional stiffness of the frame 12 have desirable calibrated stiffness gradients. Between the front and rear transverse frame members 16,18 that transfer loads to and from the suspension units 34,36,38,40, the bending and torsional stiffness is maximized adjacent the intersections of the main longitudinal frame members 20,22 with the transverse frame members 16,18, and tapers down in a manner avoiding stress concentrations to a lower stiffness in the unclad sections of the main longitudinal frame members 20,22. In the cantilevered frame section, bending and torsional stiffness is maximized adjacent the intersections of the cantilevered longitudinal frame members 28,30 with the transverse frame members 16,18, and tapers down in the forward direction in a manner avoiding stress concentrations to a lower stiffness in the unclad sections of the cantilevered longitudinal frame members 28,30.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, hut not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may come to mind for those having skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A vehicle frame having a calibrated frame stiffness gradient, the frame comprising:
   a tubular frame member defining and extending along a tubular frame member axis, and defining a top surface and a bottom surface of the tubular frame member; and
   a series of cladding plates, each cladding plate of the series of cladding plates extending along an axis of the series of cladding plates and each cladding plate fixedly attached along a faying surface to at least one of the top surface and the bottom surface of the tubular frame member, and including at least one immediately preceding cladding plate and one successive cladding plate in the series of cladding plates;
   each cladding plate of the series of cladding plates having respective axes thereof and respective proximal ends and distal ends thereof at substantially opposite axial ends of each cladding plate, with the proximal end of each successive cladding plate substantially abutting the distal end of the immediately preceding cladding plate in the series of cladding plates when the series of cladding plates is fixedly attached to the tubular frame member with the axes of each cladding plate and the series of cladding plates extending substantially along the tubular frame member axis.

2. The vehicle frame of claim 1, further including a raised trailing bead fixedly attached to the at least one of the top surface and the bottom surface of the tubular frame member and extending substantially along the tubular frame member, with the trailing bead having a proximal end of the bead abutting the distal end of a last cladding plate in the series of cladding plates, and a length of the bead extending away from the distal end of the last cladding plate along the tubular frame member, with the bead terminating in a distal end of the bead separate from the last cladding plate.

3. The vehicle frame of claim 1, wherein at least one successive cladding plate has a peripheral profile that is different from the immediately preceding cladding plate.

4. The vehicle frame of claim 3, wherein at least one cladding plate of the series of cladding plates has a peripheral profile thereof differing from the at least one of the top surface and the bottom surface of the tubular frame member adjacent the faying surface of the at least one cladding plate.

5. The vehicle frame of claim 3, wherein the at least one successive cladding plate has a peripheral profile that is smaller than the immediately preceding cladding plate.

6. The vehicle frame of claim 1, wherein the distal end of at least one immediately preceding cladding plate is substantially convex where the distal end abuts the proximal end of the respective successive cladding plate, and the proximal end of the respective successive cladding plate is concave where the proximal end abuts the convex distal end of the immediately preceding cladding plate.

7. The vehicle frame of claim 1, wherein the immediately preceding and successive cladding plates define respective thicknesses thereof, and the thickness of at least one successive cladding plate is less than the thickness of the immediately preceding cladding plate.

8. The vehicle frame of claim 7, further including a raised trailing bead fixedly attached to the at least one of the top surface and the bottom surface of the tubular frame member and extending substantially along the tubular frame member, with the trailing bead having a proximal end of the bead abutting the distal end of a last cladding plate in the series of cladding plates, and a length of the bead extending away from the distal end of the last cladding plate along the tubular frame member, with the bead terminating in a distal end of the bead separate from the last cladding plate.

9. The vehicle frame of claim 7, wherein at least one cladding plate of the series of cladding plates has a peripheral profile thereof differing from the at least one of the top surface and the bottom surface of the tubular frame member adjacent the faying surface of the at least one cladding plate.

10. The vehicle frame of claim 9, further including a raised trailing bead fixedly attached to the at least one of the top surface and the bottom surface of the tubular frame member and extending substantially along the tubular frame member, with the trailing bead having a proximal end of the bead abutting the distal end of a last cladding plate in the series of cladding plates, and a length of the bead extending away from the distal end of the last cladding plate along the tubular frame member, with the bead terminating in a distal end of the bead separate from the last cladding plate.

11. The vehicle frame of claim 7, wherein at least one successive cladding plate has a peripheral profile that is different from the immediately preceding cladding plate.

12. The vehicle frame of claim 11, further including a raised trailing bead fixedly attached to the at least one of the top surface and the bottom surface of the tubular frame member and extending substantially along the tubular frame member, with the trailing bead having a proximal end of the bead abutting the distal end of a last cladding plate in the series of cladding plates, and a length of the bead extending away from the distal end of the last cladding plate along the tubular frame member, with the bead terminating in a distal end of the bead separate from the last cladding plate.

13. The vehicle frame of claim 8, wherein:
   at least one cladding plate of the series of cladding plates has a peripheral profile thereof differing from the at least one of the top surface and the bottom surface of the tubular frame member adjacent the faying surface of the at least one cladding plate;
   at least one successive cladding plate has a peripheral profile that is different from and smaller than the immediately preceding cladding plate; and
   the distal end of at least one immediately preceding cladding plate is substantially convex where the distal end abuts the proximal end of the respective successive cladding plate, and the proximal end of the respective successive cladding plate is concave where the proximal end abuts the convex distal end of the immediately preceding cladding plate.

14. The vehicle frame of claim 13, wherein:
   the frame includes at least one longitudinal member joined to a transverse member of the frame at an intersection of the longitudinal and transverse frame members; and
   the series of cladding plates includes an immediately preceding cladding plate forming a corner reinforcement plate spanning the intersection of the longitudinal and transverse frame members, with the corner reinforcement plate being fixedly attached to both of the longitudinal and transverse frame members.

15. An agricultural product applicator including a frame having a calibrated frame stiffness gradient, the frame comprising:
   a tubular frame member defining and extending along a tubular frame member axis, and defining a top surface and a bottom surface of the tubular frame member; and a series of cladding plates extending along an axis of the series of cladding plates, each cladding plate of the series of cladding plates fixedly attached along a faying surface to the at least one of the top surface and the bottom surface of the tubular frame member, and including at least one immediately preceding cladding plate and one successive cladding plate in the series of cladding plates;

each cladding plate of the series of cladding plates having respective axes thereof and respective proximal ends and distal ends thereof at substantially opposite axial ends of the series of cladding plates, with the proximal end of each successive cladding plate substantially abutting the distal end of the immediately preceding cladding plate in the series of cladding plates when the series of cladding plates is fixedly attached to the at least one of the top surface and the bottom surface of the tubular frame member with the axes of each cladding plate and the series of cladding plates extending substantially along the tubular frame member axis.

16. The agricultural product applicator of claim 15, wherein:

the frame includes at least one longitudinal member joined to a transverse member of the frame at an intersection of the longitudinal and transverse frame members; and the series of cladding plates includes an immediately preceding cladding plate forming a corner reinforcement plate spanning the intersection of the longitudinal and transverse frame members, with the corner reinforcement plate being fixedly attached to both of the longitudinal and transverse frame members.

17. The agricultural product applicator of claim 16, wherein:

the immediately preceding and successive cladding plates define respective thicknesses thereof, and the thickness of at least one successive cladding plate is less than the thickness of the immediately preceding cladding plate;

at least one cladding plate of the series of cladding plates has a peripheral profile thereof differing from the at least one of the top surface and the bottom surface of the tubular frame member adjacent the faying surface of the at least one cladding plate;

at least one successive cladding plate has a peripheral profile that is different from and smaller than the immediately preceding cladding plate; and the distal end of at least one immediately preceding cladding plate is substantially convex where the distal end abuts the proximal end of the respective successive cladding plate, and the proximal end of the respective successive cladding plate is concave where the proximal end abuts the convex distal end of the immediately preceding cladding plate.

18. The agricultural product applicator of claim 17, further including a raised trailing bead fixedly attached to the at least one of the top surface and the bottom surface of the tubular frame member and extending substantially along the tubular frame member, with the trailing bead having a proximal end of the bead abutting the distal end of a last cladding plate in the series of cladding plates, and a length of the bead extending away from the distal end of the last cladding plate along the tubular frame member, with the bead terminating in a distal end of the bead separate from the last cladding plate.

19. A method for providing a vehicle frame including a tubular frame member having a calibrated frame stiffness gradient, the method comprising:

fixedly attaching a series of cladding plates extending along an axis of the series of cladding plates along faying surfaces to at least one of a top surface and a bottom surface of the tubular member, with the series of cladding plates including at least one immediately preceding cladding plate and one successive cladding plate in the series of cladding plates;

with each cladding plate of the series of cladding plates having respective axes thereof and respective proximal ends and distal ends thereof at substantially opposite axial ends of the cladding plates, with the proximal end of each successive cladding plate substantially abutting the distal end of the immediately preceding cladding plate in the series when the series of cladding plates is fixedly attached to the tubular frame member with the axes of the cladding plates and series of cladding plates extending substantially along the tubular frame member axis.

20. The method for providing a vehicle frame including a tubular frame member having a calibrated frame stiffness gradient of claim 19, further including at least one step from the group of steps consisting of:

providing a raised trailing bead fixedly attached to the at least one of the top surface and the bottom surface of the tubular frame member and extending substantially along the tubular frame member, with the trailing bead having a proximal end of the bead abutting the distal end of a last cladding plate in the series of cladding plates, and a length of the bead extending away from the distal end of the last cladding plate along the tubular frame member, with the bead terminating in a distal end of the bead separate from the last cladding plate;

configuring at least one successive cladding plate to have a peripheral profile that is different from the immediately preceding cladding plate;

configuring at least one cladding plate of the series of cladding plates to have a peripheral profile thereof differing from the at least one of the top surface and the bottom surface of the tubular frame member adjacent the faying surface of the at least one cladding plate;

configuring at least one successive cladding plate to have a peripheral profile that is smaller than the immediately preceding cladding plate;

configuring the distal end of at least one immediately preceding cladding plate to be substantially convex where the distal end abuts the proximal end of the respective successive cladding plate, and cooperatively configuring the proximal end of the respective successive cladding plate to be concave where the proximal end abuts the convex distal end of the immediately preceding cladding plate;

configuring the thickness of at least one successive cladding plate to be less than the thickness of the immediately preceding cladding plate; and where the frame includes at least one longitudinal member joined to a transverse member of the frame at an intersection of the longitudinal and transverse frame members, configuring the series of cladding plates to include an immediately preceding cladding plate forming a corner reinforcement plate spanning the intersection of the longitudinal and transverse frame members, with the corner reinforcement plate being fixedly attached to both of the longitudinal and transverse frame members.

* * * * *